United States Patent
Lin

(10) Patent No.: US 7,181,088 B2
(45) Date of Patent: Feb. 20, 2007

(54) METHOD FOR CONSTRUCTING A GAMMA TABLE TO PERFORM GAMMA CORRECTION ACCORDING TO THE GAMMA TABLE

(75) Inventor: Hsing-Hung Lin, Hsinchu (TW)

(73) Assignee: Avision Inc., Hsinchu (TW)

( * ) Notice: Subject to any disclaimer, the term of this patent is extended or adjusted under 35 U.S.C. 154(b) by 799 days.

(21) Appl. No.: 10/452,193

(22) Filed: Jun. 3, 2003

(65) Prior Publication Data
US 2003/0231366 A1    Dec. 18, 2003

(30) Foreign Application Priority Data
Jun. 13, 2002    (TW) ............... 91112967 A

(51) Int. Cl.
*G06K 9/40*    (2006.01)
(52) U.S. Cl. .................... 382/274; 382/167
(58) Field of Classification Search .............. 382/167, 382/169, 274; 358/519; 345/600, 601, 690; 348/674
See application file for complete search history.

(56) References Cited

U.S. PATENT DOCUMENTS 6,292,165 B1 * 9/2001 Lin et al. ............... 345/690
6,344,857 B1 * 2/2002 Matono et al. ............ 345/600
7,061,504 B1 * 6/2006 Glen ......................... 345/600

* cited by examiner

Primary Examiner—Phuoc Tran
(74) Attorney, Agent, or Firm—Rabin & Berdo, P.C.

(57) ABSTRACT

A method for constructing a Gamma table to perform Gamma correction according to the Gamma table. First, select ($2^M+1$) major sampling pixel data, which divide a Gamma curve into $2^M$ major segments. Next, obtain the maximum difference between the n-th major sampling line and the n-th major Gamma segment; according to the maximum difference, select ($2^{Rn}-1$) minor sampling pixel data from the n-th major Gamma segment. Last, store the Gamma corresponding relationship of all major and minor sampling pixel data in the Gamma table. The execution of Gamma correction includes the following steps. First, select the a-th major sampling pixel datum according to the first M bits of an input pixel datum. Next, select the b-th and the (b+1)-th minor sampling pixel data according to the (M+1)-th bit to the (M+$R_a$)-th bit of the input pixel datum. Finally, obtain the Gamma corresponding relationship of the input pixel datum via interpolation using the b-th and the (b+1)-th minor sampling pixel data.

16 Claims, 6 Drawing Sheets

METHOD FOR CONSTRUCTING A GAMMA TABLE TO PERFORM GAMMA CORRECTION ACCORDING TO THE GAMMA TABLE

This application claims the benefit of Taiwan application Serial No. 91112967, filed on Jun. 13, 2002.

BACKGROUND OF THE INVENTION

1. Field of the Invention

The invention relates in general to a Gamma correction method, and more particularly to a method for constructing a Gamma table to perform Gamma correction according to the Gamma table.

2. Description of the Related Art

The growth experienced in the computer industry brings along prosperity and development to its peripheral industries. The scanner, which helps the user to scan and store documents or images in the format of electronic files bringing great convenience to the user.

Please refer to FIG. 1, a schematic diagram of a Gamma curve illustrating the relationship between pixel data as shown in X-axis and pixel intensity as shown in Y-axis. An acquired picture obtained by scanning a picture is composed of a plurality of binary pixel data, which represent the intensity level for every corresponding dot of the picture. The relationship between pixel data and pixel intensity is illustrated in a Gamma curve as shown in FIG. 1. In the course of scanning, the scanner needs to execute pixel data conversion. After the pixel data conversion, a linear relationship should be obtained between the intensity level of every dot of the scanned picture and the acquired pixel data via scanning according to the Gamma curve. The above-mentioned conversion is called the "Gamma correction". In this text, the relationship between actual pixel data and the pixel intensity obtained after the execution of Gamma correction is called the "Gamma relationship of pixel data". Gamma correction is used to improve the display quality of the picture output of a scanner.

Suppose the pixel data produced by a color scanner are binary data of 16 bits. In order to store the corresponding Gamma relationship of pixel data, the scanner needs to have a memory capacity of at least $2^{16} \times 3$ bytes (about 384 KB) for three primary colors namely the red, blue and green. The corresponding Gamma relationships of pixel data are referred to as a Gamma table. Because a large amount of memory capacity is required, the Gamma table is normally stored in an external memory device, such as a dynamic random access memory (DRAM) or a synchronous DRAM (SDRAM), outside the control IC of the scanner. When Gamma correction is performed, the execution speed is subject to the data access speed of the SDRAM or the DRAM as well as the capacity of the memory. In addition, the higher the memory capacity, the higher the price.

In order to speed up Gamma correction, a conventional approach is to reduce the size of Gamma table by storing the Gamma relationships of a part of pixel data only, leaving the Gamma relationships of the rest to be obtained via interpolation according to the Gamma relationships of the stored pixel data which are adjacent to the pixel data whose Gamma relationship are to be obtained. The selected and stored pixel data are called the "sampling pixel data". One of the conventional sampling methods for sampling pixel data is to sample pixel data at a fixed interval. That is to say, the difference between every sampling pixel datum and its adjacent sampling pixel datum is a fixed value. When ranked in order, the pixel data will show an arithmetical series.

Please refer to FIG. 2, a schematic diagram illustrating a conventional Gamma correction method. For example, when Gamma correction is performed on pixel datum P3, the corresponding Gamma relationship of two sampling pixel data P1 and P2, which are close to P3, have already been stored in the Gamma table. According to the Gamma curve, sampling pixel data P1 and P2 correspond to pixel intensities L1 and L2 respectively. By means of interpolation, pixel intensity L3 corresponding to pixel datum P3 can be obtained accordingly. Therefore, the memory required to store the Gamma table can be further reduced. Moreover, the speed for executing Gamma correction can be further improved if the synchronous random access memory (SRAM) inside the control IC of the scanner is used to store the Gamma table.

The disadvantage for the above-mentioned conventional method lies in performing interpolation on pixel data that correspond to a portion of the Gamma curve whose slope changes widely. In this case, the discrepancy between the actual and the calculated Gamma relationships could be relatively large. Referring to FIG. 2, all of the three pixel data, P1, P2 and P3, lie on a segment of Gamma curve indicated by a dashed rectangular shown in FIG. 1. As can be examined from FIG. 2, with respect to pixel datum P3, a great discrepancy exists between the actual intensity, L3', obtained from the Gamma curve and the calculated one, L3, obtained via interpolation. Such a great discrepancy will degrade the performance of Gamma correction and the display quality of scanned pictures.

In a Gamma curve of 2.2, for example, the actual curve ranges from (X, Y)=(0, 0) to (X, Y)=(256, 5260). Given X=61, the Y-value obtained via interpolation is 1,235 when the actual Y-value is 2,725. The resulting error is 1,490 or about 5.8 times $2^8$. Such a great discrepancy is indeed too large to be accepted.

SUMMARY OF THE INVENTION

It is therefore an object of the invention to provide a method for constructing a Gamma table to perform Gamma correction according to the Gamma table so as to save memory space for the storage of the Gamma table and increase accuracy in Gamma correction. That is, the discrepancy between the calculated and the actual Gamma relationships of pixel data can be further reduced without using a significant amount of memory during Gamma correction.

According to the object of the invention, a method for constructing a Gamma table to perform Gamma correction according to the Gamma table so as to obtain a Gamma relationship of binary pixel data of J bits. The construction of Gamma table includes steps thereinafter. First, $(2^M+1)$ major sampling pixel data are selected from a Gamma curve, wherein the major sampling pixel data are sequentially numbered from a first major sampling pixel datum to a $(2^M+1)$-th major sampling pixel and divide the Gamma curve into $2^M$ major segments, sequentially numbered from a first major Gamma segment to a $2^M$-th major Gamma segment, where M is a positive integer smaller than J. Next, every two adjacent major sampling pixel data are employed to form $2^M$ main sampling lines, sequentially numbered from a first major sampling line to a $2^M$-th major sampling line, wherein the n-th major sampling line corresponds to the n-th major Gamma segment and n is a positive integer ranging from 1 to $2^M$. Following that, a maximum difference $D_n$ between every n-th major sampling line and n-th major Gamma segment is calculated. According to the maximum difference $D_n$, $(2^{Rn}-1)$ minor sampling pixel data are then selected from the n-th major Gamma segment, sequentially numbered from a first minor sampling pixel datum to a $(2^{Rn}-1)$-th minor sampling pixel datum, wherein $R_n$ is a value corresponding to the n-th major sampling pixel datum and the n-th major Gamma segment. Finally, the Gamma relationships of all major and minor sampling pixel data are stored in the Gamma table. Further, Gamma correction of an input pixel datum according to the Gamma table includes the following steps. First of all, the a-th major sampling pixel datum is selected according to the first M bits of the input pixel datum, wherein 'a' is a positive integer of 1 to $2^M$. Next, the b-th and the (b+1)-th minor sampling pixel data are selected according to the (M+1)-th bit to the $(M+R_a)$-th bit of the input pixel datum, wherein b is a positive integer of 1 to $R_a$. Finally, the Gamma corresponding relationship of the input pixel datum is determined via interpolation using the b-th and the (b+1)-th minor sampling pixel data.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention is featured by determining the number of sampling pixel data for every segment of the Gamma curve according to changes in the slope of a segment in the course of constructing a Gamma table. In doing so, not only can the memory capacity required for the storage of Gamma table be reduced, but the discrepancy between the actual and the calculated Gamma corresponding relationship can also be reduced during the execution of Gamma correction.

Figure 1:
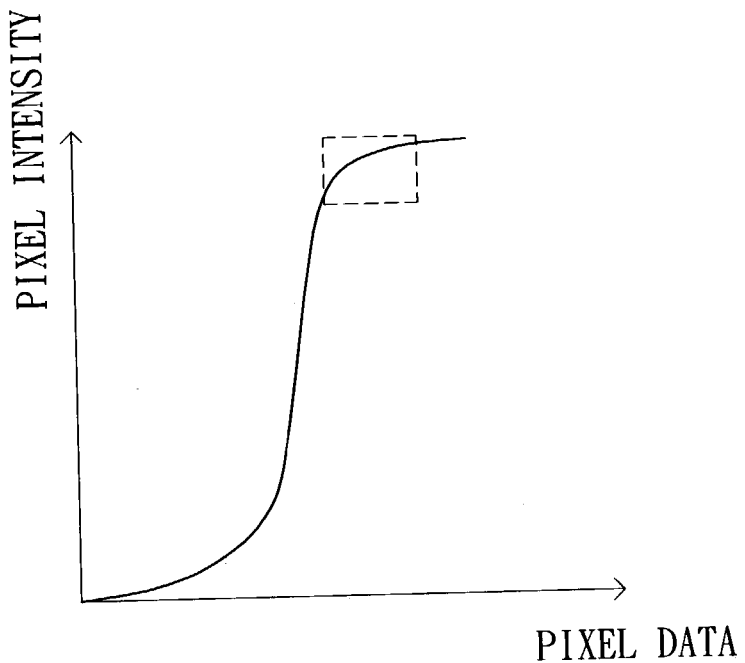
FIG. 1 (Prior Art) is a Gamma curve illustrating the relationship between pixel data and pixel intensity.
Figure 2:
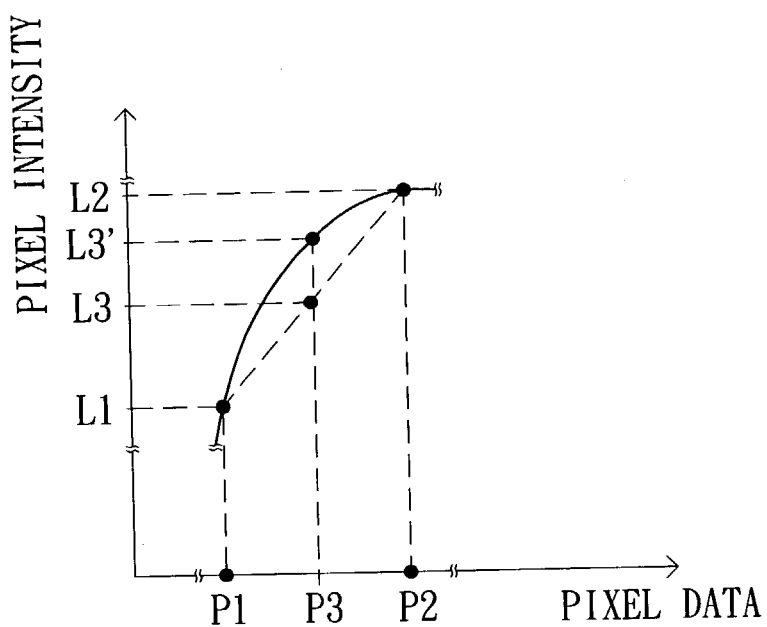
FIG. 2 (Prior Art) is a schematic diagram illustrating a conventional method for Gamma correction.
Figure 3:
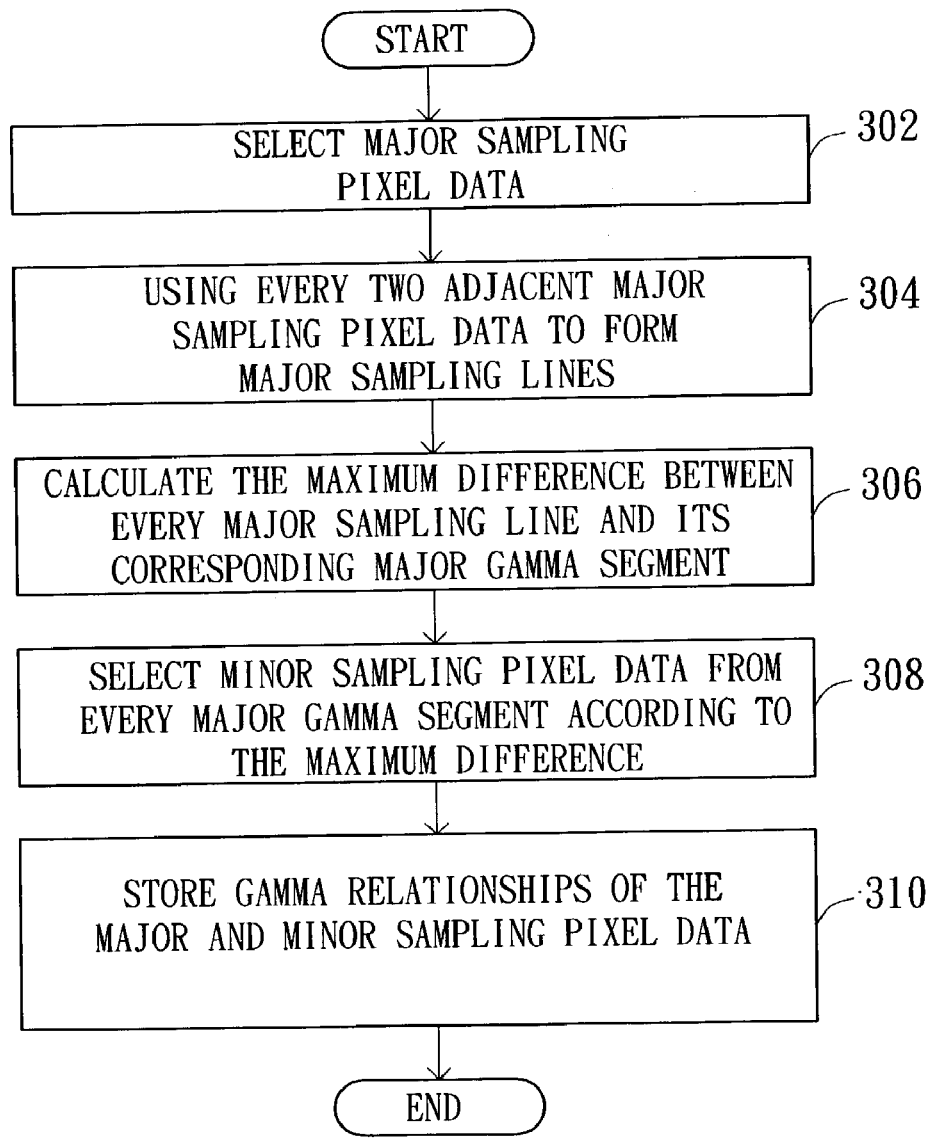
FIG. 3 is a flowchart of a method for constructing a Gamma table according to the invention.

A Gamma table needs to be established before the Gamma correction according to the invention can be executed. In the preferred embodiment according to the invention, pixel data are binary data of 16 bits. Please refer to FIG. 3, a flowchart of a method for constructing a Gamma table according to the invention. First, step 302 is performed. 129 $(=2^7+1)$ major sampling pixel data are selected from a Gamma curve, which are sequentially numbered from a first major sampling pixel datum to a $129^{th}$ major sampling pixel datum. For the sake of hardware circuit design, the number of sampling pixel data selected is set to be powers of 2 plus 1. While 129 $(=2^7+1)$ major sampling pixel data are selected in the preferred embodiment, the number of major sampling pixel data selected is not limited to 129; any number of major sampling pixel data selected would do, 65 or 257 for instance, as long as these pixel data can divide the Gamma curve into segments amounting to powers of 2. The method for selecting these major sampling pixel data bears no difference with the familiar selecting method for sampling pixel data. When ranked in order, the selected major sampling pixel data will form an arithmetical series. These major sampling pixel data are binary data of 16 bits; furthermore, all of the first 7 bits of a major sampling pixel datum are different. The major sampling pixel data divide the Gamma curve into 128 segments, wherein every segment is called a "major Gamma segment" and the 128 segments are consecutively numbered from the first major Gamma segment to the $128^{th}$ major Gamma segment.

Figure 4:
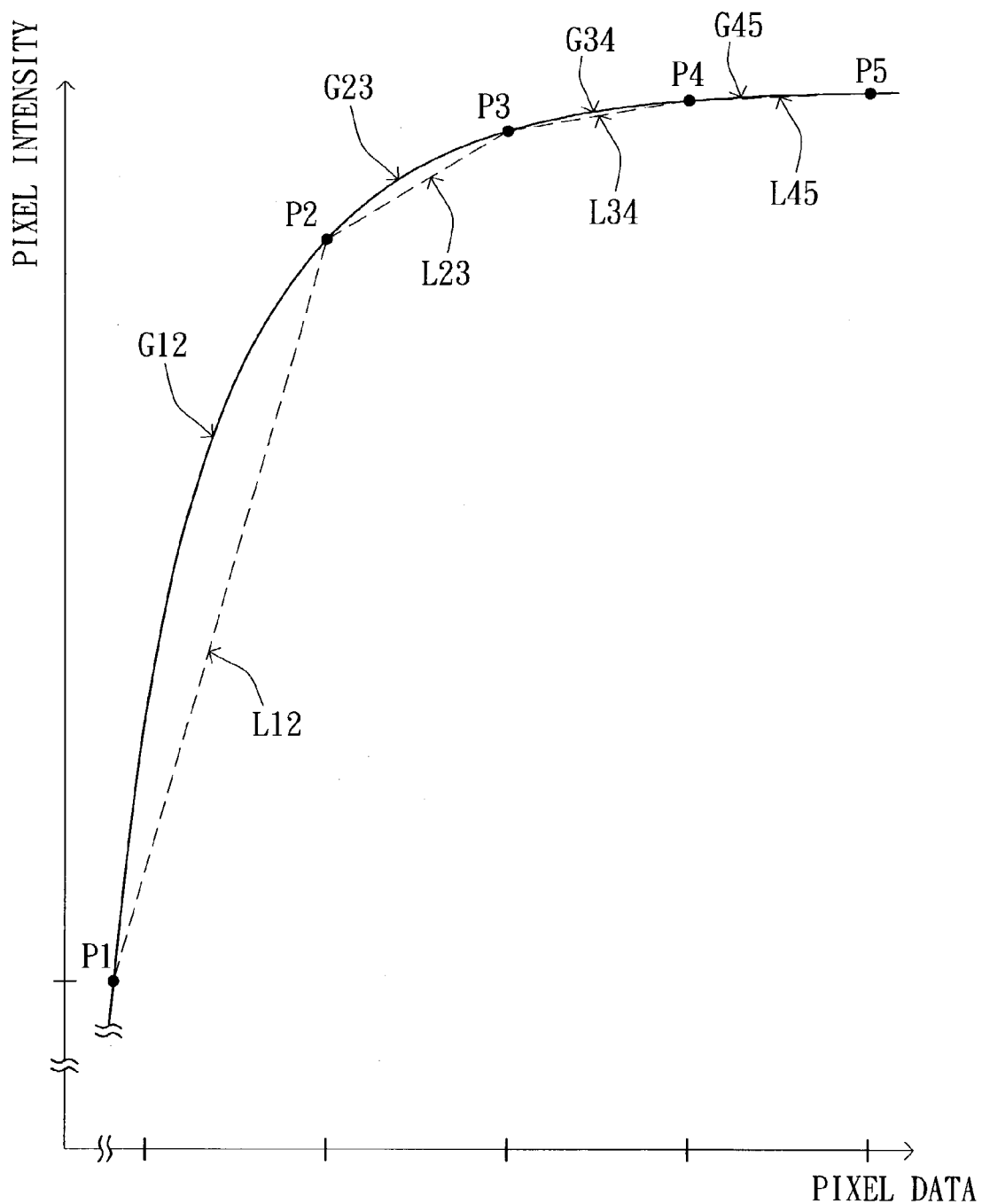
FIG. 4 is a schematic diagram explaining a method for constructing a Gamma table according to the invention.

Please refer to FIG. 4, a schematic diagram explaining a method for constructing a Gamma table according to the invention. In FIG. 4, a selected part of Gamma curve illustrating the execution of Gamma correction is shown. In step 302, 5 major sampling pixel data, sequentially denoted by P1, P2, P3, P4, and P5, are selected from the Gamma curve. The 5 major sampling pixel data form an arithmetical series and further divide the selected segment of the Gamma curve into 4 major Gamma segments, sequentially denoted by G12, G23, G34 and G45, as shown in FIG. 4.

Next, step 304 is performed. In step 304, every two adjacent major sampling pixel data are employed to form 128 major sampling lines, sequentially numbered from the first major sampling line to the $128^{th}$ major sampling line, wherein the major sampling lines correspond to respective major Gamma segments. As illustrated in FIG. 4, 4 major sampling lines, namely L12, L23, L34 and L45 depicted in dashed lines, are formed by connecting P1, P2, P3, P4 and P5. The 4 major sampling lines L12, L23, L34 and L45 correspond to the 4 major Gamma segments G12, G23, G34 and G45 respectively.

Next, the method proceeds to step 306. The difference between every major sampling line and its corresponding major Gamma segment is calculated in order to obtain the maximum difference in every segment. Take major sampling line L12 and major Gamma segment G12 in FIG. 4 for example. The difference between the corresponding major sampling line and its corresponding major Gamma segment is determined for every pixel datum lying between pixel data P1 and P2. Among these differences, D12 is the maximum of the differences between major sampling line L12 and major Gamma segment G12. Similarly, D23, D34, and D45, the maximum differences between major sampling line L23 and major Gamma segment G23, major sampling line L34 and major Gamma segment G34, major sampling line L45 and major Gamma segment G45, respectively, can be obtained.

After that, step 308 is performed. A plurality of minor sampling pixel data are selected from every major Gamma segment according to the maximum difference between the major Gamma segment and corresponding major sampling line. Step 308 is equivalent to insert a plurality of corresponding minor sampling pixel data between every two adjacent major sampling pixel data. Minor sampling pixel data are selected as follows. First, the maximum value is selected from the differences between every corresponding major Gamma segment and major sampling line. Next, a plurality of minor sampling pixel data are selected from the selected major Gamma segment. It is noteworthy that the number of minor sampling pixel data selected from every major Gamma segment might not be the same. A larger difference between a major Gamma segment and its corresponding major sampling line signifies a greater change in the slope of the major Gamma segment, which indicates that the corresponding major sampling line is a lower-level approximation of the major Gamma segment. For example, a larger D12, the difference between major sampling line L12 and major Gamma segment G12, implies that L12 is a lower-level approximation of G12. Therefore, more minor sampling pixel data will be selected from major Gamma segment G12. Conversely, a smaller difference between a major Gamma segment and its corresponding major sampling line implies a smaller change in the slope of the major Gamma segment, which means that the corresponding major sampling line is a higher-level approximation of the major Gamma segment. For example, D45, the difference between major sampling line L45 and major Gamma segment G45, is the smallest in FIG. 4; this implies that L45 is a higher-level approximation of G45. Therefore, the number of minor sampling pixel data needed to be selected from major Gamma segment G45 will be smaller.

In addition, considering the hardware design of circuits, it would be better to set the number of minor sampling pixel data selected from every major Gamma segment to be $2^n-1$, where n is a positive integer. In the preferred embodiment, since the pixel data are binary data of 16 bits and the number of selected sampling pixel data equals 27, the maximum value of n cannot be greater than 9 (=16−7). With n being set to be 4 in the preferred embodiment, the maximum number of minor sampling pixel data selected from every major Gamma segment equals 15 (=$2^4-1$). In addition, the n-value corresponding to every major Gamma segment might not be the same. Thus the number of minor sampling pixel data selected from the n-th major Gamma segment equals $2^{Rn}-1$, where n is a positive integer ranging from 1 to 127 while the values of $R_n$ differ in every major Gamma segment. Moreover, when ranked in order, all of the minor sampling pixel data selected from a major Gamma segment will form an arithmetical series.

Take FIG. 4 for example. As D12 is the largest among the 4 differences D12, D23, D34 and D45, a plurality of minor sampling pixel data will be selected from major Gamma segment G12.

Figure 5A:
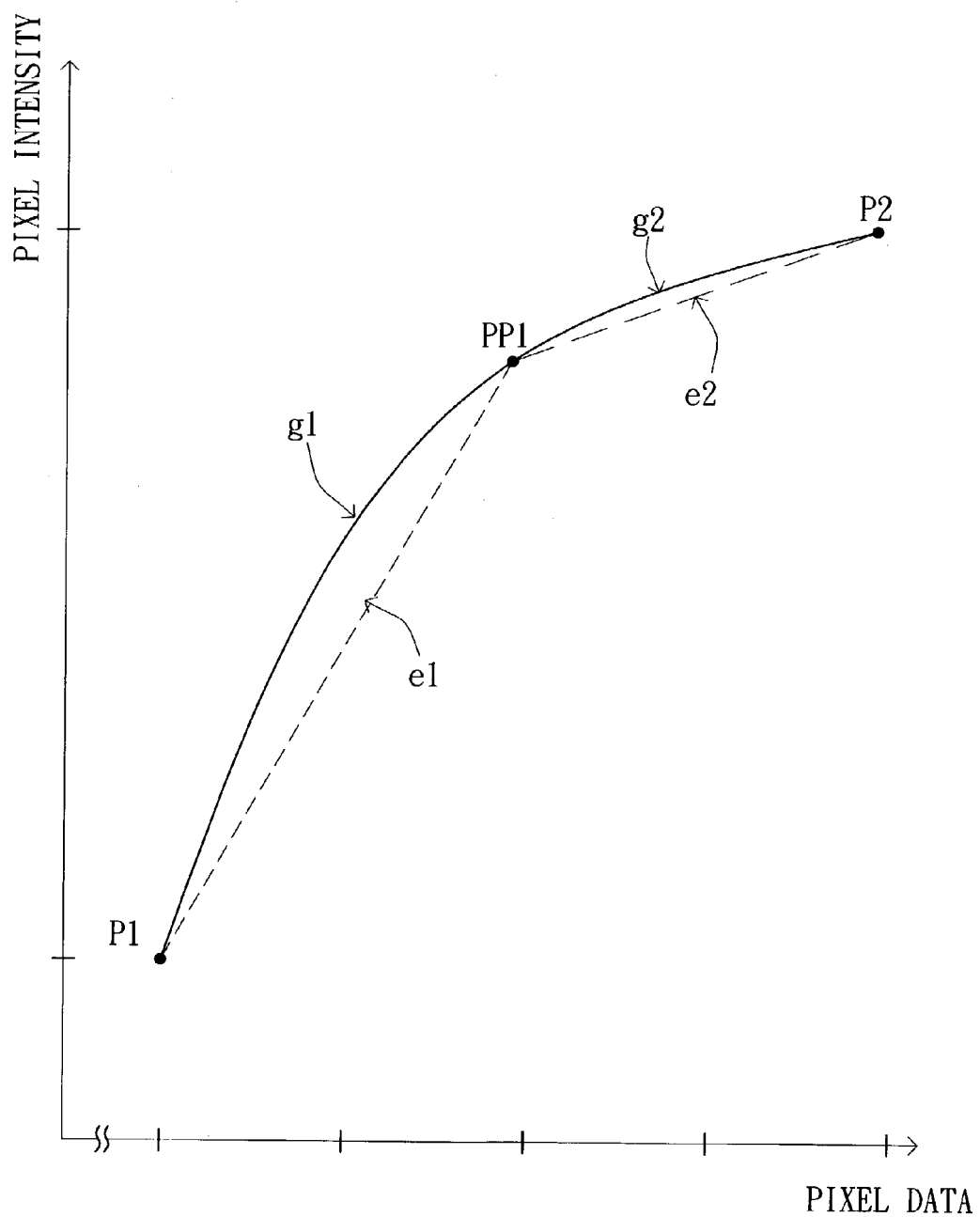
FIGS. 5A–5B are schematic diagrams explaining how the number of minor sampling pixel data are determined in a method for constructing a Gamma table according to the invention.
Figure 5B:
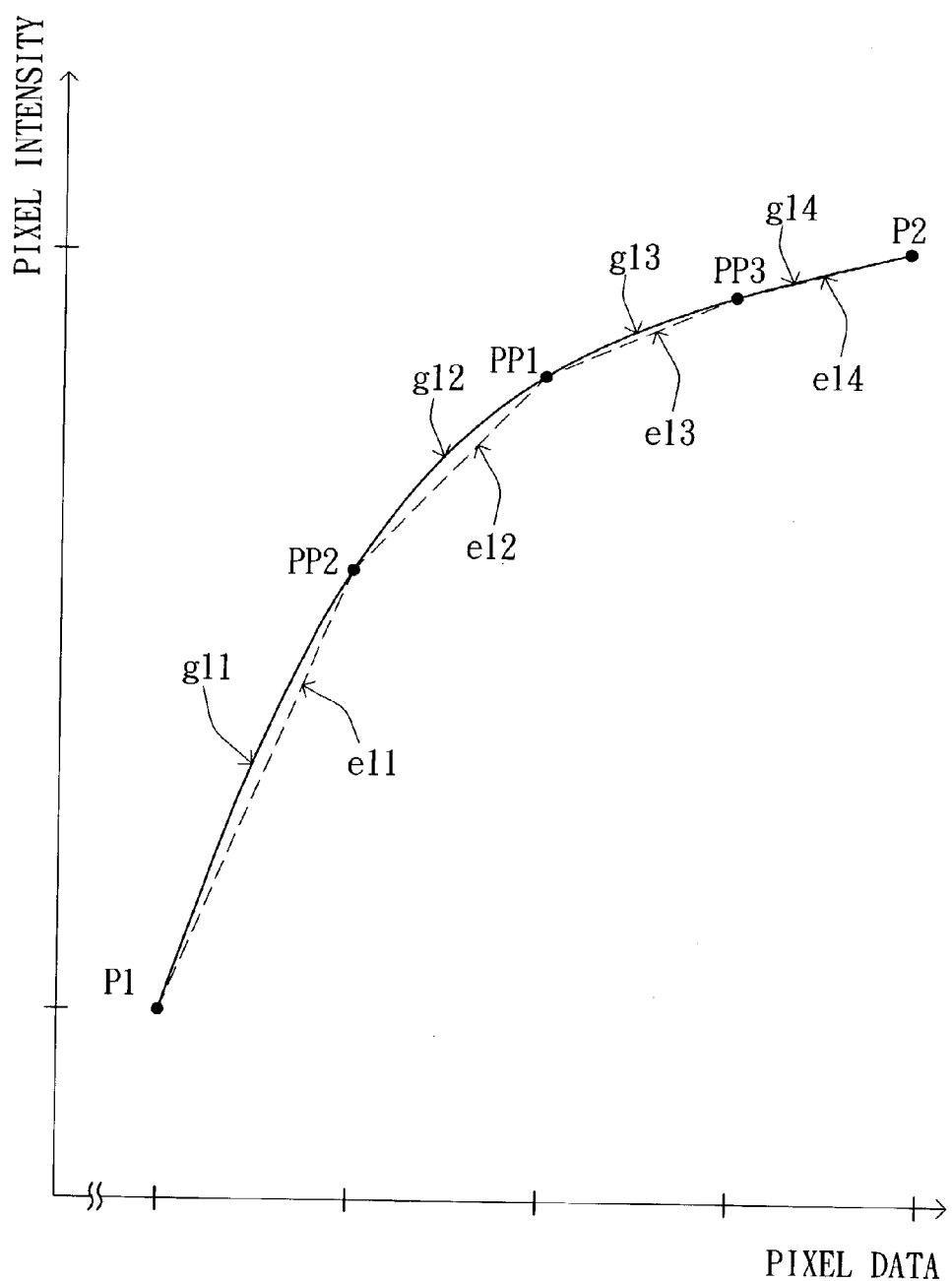

Please refer to FIGS. 5A and 5B, two schematic diagrams explaining how the number of minor sampling pixel data is determined in a method for constructing a Gamma table according to the invention. FIGS. 5A and 5B explain the method for selecting minor sampling pixel data using major Gamma segment G12 as an example. When selecting minor sampling pixel data from major Gamma segment G12, first of all, the first minor sampling pixel datum PP1 is obtained by averaging the two major sampling pixel data P1 and P2, as shown in FIG. 5A. Next, minor Gamma segments g1 and g2, minor sampling lines e1 and e2, as well as the maximum differences between every minor Gamma segment and its corresponding minor sampling line d1 and d2 are determined based on the major Gamma segment G12. In addition, they are determined in the same way as the method for determining the respective maxima of differences between major Gamma segments and major sampling lines, as in steps 302, 304 and 306. It is noteworthy that the scale used in FIG. 4 is different from that used in FIG. 5A, and FIG. 5B. Therefore, any direct comparison between these figures would be inappropriate. Following that, d1 and d2 are compared to D23, D34 and D45 of FIG. 4. If any of d1 or d2 is larger than D23, D34 and D45, more minor sampling pixel data are needed to be selected from main Gamma segment G12. Please refer to FIG. 5B. Minor sampling pixel data PP2 and PP3 are selected from between P1 and PP1 and between PP1 and P2, respectively. Then, according to the method disclosed above, it is to determine minor Gamma segments g11, g12, g13 and g14, minor sampling lines e11, e12, e13 and e14, and the corresponding differences between respective minor Gamma segments and minor sampling lines d1, d12, d13 and d14. Afterwards, d11, d12, d13 and d14 are compared with D23, D34 and D45. The same procedure is repeated until the value of any of D23, D34 or D45, say, D23, is larger than the maximum of respective differences between all minor Gamma segments and corresponding minor sampling lines in major Gamma segment G12. Following that, minor sampling pixel data are selected from the corresponding major Gamma segment G23 of D23. It can be understood from FIGS. 5A–5B and the above disclosures that the number of minor sampling pixel data is powers of 2 minus 1 ($2^n-1$, where n is a positive integer). In the preferred embodiment, at most 15 minor sampling pixel data can be selected from every major Gamma segment. In addition, every time that the minor sampling pixel data have been selected, additional minor sampling pixel data will be selected and the number of the additional minor sampling pixel data is according to the maximum value of respective differences between Gamma segments and sampling lines. The same procedure is repeated until the predetermined number of minor sampling pixel data selected has been reached.

At last, step 310 is performed. Gamma relationships of all of the major and minor sampling pixel data are stored according to the Gamma curve in the memory. The collection of the Gamma relationships of all major and minor sampling pixel data constitutes the Gamma table whereby Gamma correction is executed.

Figure 6:
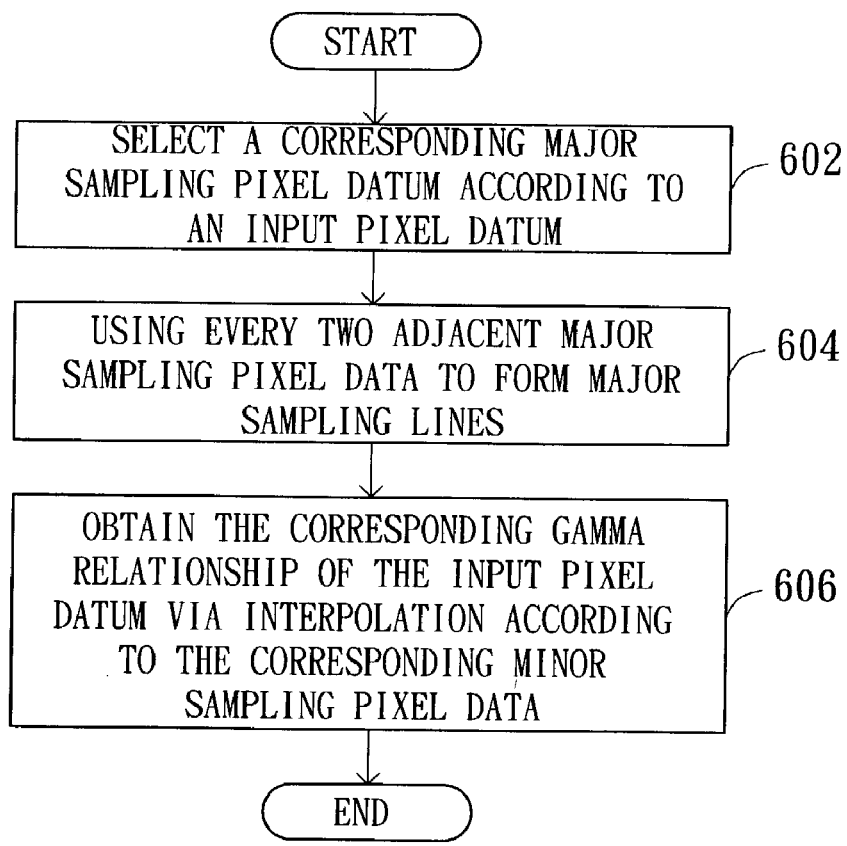
FIG. 6 is a flowchart illustrating a Gamma correction method according to the invention.

Please refer to FIG. 6, a flowchart illustrating a Gamma correction method according to the invention. Corresponding Gamma relationship of each pixel datum can be obtained via the execution of Gamma correction according to the Gamma table disclosed above.

According to the foregoing disclosure, pixel data are binary data of 16 bits. The Gamma correction method for obtaining a Gamma relationship of an input pixel datum according to the invention includes the following steps. First, in step 602, a corresponding major sampling pixel datum is selected from the Gamma table according to the value of the first 7 bits of the input pixel data. As disclosed before, the values of the first 7 bits of the major pixel data are different from one another. Therefore, the major sampling pixel datum whose first 7 bits are identical to that of the input pixel datum is the corresponding major sampling pixel datum of the input pixel datum.

Next, in step 604, a corresponding minor sampling pixel datum is selected. As disclosed above, each major Gamma segment corresponds to different number of minor sampling pixel data. Thus, in step 604, the corresponding minor sampling pixel datum is selected according to a set of bits of the input pixel datum, wherein which set of bits of the input pixel datum are employed as such a criterion is determined according to the number of minor sampling pixel data in the corresponding major Gamma segment of the selected major sampling pixel datum in step 602. Assuming that the 34$^{th}$ major sampling pixel datum is selected in step 602 and that 7 (=$2^3-1$) minor sampling pixel data are found from the Gamma table to be associated with the 34$^{th}$ major Gamma segment. When step 604 is performed, the corresponding minor sampling pixel datum is selected from the 7 minor sampling pixel data located on the 34$^{th}$ major Gamma segment, according to the value of the 8$^{th}$, the 9$^{th}$ and the 10$^{th}$ bit of the input pixel datum. The minor sampling pixel datum whose first 10 bits are identical to that of the input pixel datum is the corresponding minor sampling pixel datum of the input pixel datum.

In step 604, the corresponding minor sampling pixel datum and its immediate adjacent minor sampling pixel datum are selected. For example, the selected minor sampling pixel data are the $3^{rd}$ minor sampling pixel datum and the $4^{th}$ minor sampling pixel datum.

Last, step 606 is performed to obtain the Gamma corresponding relationship of the input pixel datum via interpolation according to the values of the input pixel datum and the two selected minor sampling pixel data. In the invention, the number of minor sampling pixel data selected from every major Gamma segment is different. When a major sampling line is a lower level approximation of its corresponding major Gamma segment, i.e., major Gamma segment having greater changes in its slope, more number of minor sampling pixel data are selected to reduce the differences between adjacent minor sampling pixel data. Thus, when adjacent minor sampling pixel data are used as the basis to obtain the Gamma corresponding relationship via interpolation, errors will not be intensified even when the change in the slope of the major Gamma segment turns larger. Regardless of where the value of an input pixel datum is located on the Gamma curve, no large discrepancy will occur between the actual and the calculated Gamma corresponding relationships obtained according to the invention.

As disclosed above, in terms of structure, the invention can be configured in an internal memory of an application-specific integrated circuit. As processing time is the same with the case in conventional practices, no additional complex processing circuit is required. With respect to precision, given a Gamma curve of 2.2, the maximum error can be controlled under 200, which is 7.45 times smaller than the error (e.g. 1490) produced by the conventional approach mentioned above.

The above preferred embodiment according to the invention discloses a method for constructing a Gamma table and a Gamma correction method executed according to the Gamma table. During the construction of the Gamma table, the number of sampling pixel data to be stored is determined according to the changes in the slope of every segment of the Gamma curve. If changes in the slope of a segment of the Gamma curve are large, more minor sampling pixel data are required to be selected. On one hand, the memory required to store the Gamma table can be reduced. On the other hand, Gamma correction of an input pixel datum according to the invention results in no large discrepancy between the actual Gamma relationship and the Gamma relationship obtained according to the invention, regardless of where the input pixel datum is located on the Gamma curve.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for constructing a Gamma table to perform Gamma correction according to the Gamma table so as to obtain a Gamma relationship of an input pixel datum, wherein the pixel datum is represented by a binary datum of J bits and J is a positive integer, the method comprising the steps of:

a) constructing a Gamma table, wherein the Gamma table comprises a plurality of sampling pixel data and the corresponding Gamma relationship for every sampling pixel datum; each of the sampling pixel data is a binary datum of J bits; and the Gamma table is constructed by at least the steps of:

a1. selecting $(2^M+1)$ major sampling pixel data from a Gamma curve, wherein the $(2^M+1)$ major sampling pixel data are sequentially numbered from a first major sampling pixel datum to a $(2^M+1)$-th major sampling pixel datum, and further divide the Gamma curve into $2^M$ major segments, sequentially numbered from a first major Gamma segment to the $2^M$-th major Gamma segment, where M is a positive integer smaller than J;

a2. using every two adjacent major sampling pixel data to form $2^M$ major sampling lines, sequentially numbered from a first major sampling line to a $2^M$-th major sampling line, wherein the n-th major sampling line corresponds to the n-th major Gamma segment where n is a positive integer ranging from 1 to $2^M$;

a3. determining a maximum difference $D_n$ between the n-th major sampling line and n-th major Gamma segment;

a4. according to the maximum difference $D_n$, selecting $(2^{R_n}-1)$ minor sampling pixel data from the n-th major Gamma segment, which are sequentially numbered from a first minor sampling pixel datum to a $(2^{R_n}-1)$-th minor sampling pixel datum, wherein $R_n$ is a value corresponding to the n-th major sampling pixel datum and the n-th major Gamma segment; and a5. storing the Gamma relationship of these major and minor sampling pixel data in the Gamma table; and b) executing Gamma correction according to the Gamma table to obtain the Gamma relationship of the input pixel datum, comprising the following steps:

b1. selecting the a-th major sampling pixel datum according to first M bits of the input pixel data, wherein a is a positive integer of 1 to 2M;

b2. selecting corresponding b-th and (b+1)-th minor sampling pixel data of the a-th major sampling pixel datum, according to (M+1)-th to $(M+R_a)$-th bits of the input pixel data, wherein 'b' is a positive integer of 1 to $R_a$; and b3. obtaining the Gamma corresponding relationship of the input pixel datum via interpolation using the b-th and the (b+1)-th minor sampling pixel data.

2. A method according to claim 1, wherein the 2M+1 major sampling pixel data sequentially form an arithmetical series.

3. A method according to claim 1, wherein the value of $R_n$, which corresponds to the number of minor sampling pixel data needed to be selected from the n-th major Gamma segment, increases with the maximum difference $D_n$ between the n-th major sampling line and its corresponding n-th major Gamma segment.

4. A method according to claim 1, wherein the $2^{R_n}-1$ minor sampling pixel data selected from the n-th major Gamma segment form an arithmetical series.

5. A method according to claim 1, wherein each $R_n$ is smaller than (J−M).

6. A method according to claim 1, wherein the first M bits of the input pixel datum are identical to the first M bits of the a-th major sampling pixel datum.

7. A method according to claim 6, wherein the first $(M+R_a)$ bits of the b-th minor pixel datum are identical to the first $(M+R_a)$ bits of the pixel datum.

8. A method according to claim 1, wherein the Gamma correction is applied in a scanner.

9. A method for constructing a Gamma table used in the execution of Gamma correction of an input pixel datum, wherein the input pixel datum is a binary datum of J bits and J is a positive integer, the method comprising the steps of:

selecting $(2^M+1)$ major sampling pixel data from a Gamma curve, wherein the major sampling pixel data are sequentially numbered from a first major sampling pixel datum to a $(2^M+1)$-th major sampling pixel datum, and further divide the Gamma curve into $2^M$ major segments, sequentially numbered as a first major Gamma segment to a $(2^M)$-th major Gamma segment, where M is a positive integer smaller than J;

using every two adjacent major sampling pixel data to form $2^M$ major sampling lines, sequentially numbered from a first major sampling line to a $2^M$-th major sampling line, wherein the n-th major sampling line corresponds to the n-th major Gamma segment where n is a positive integer ranging from 1 to $2^M$;

calculating the difference between every n-th major sampling line and n-th major Gamma segment respectively to obtain a maximum difference $D_n$;

according to the maximum difference $D_n$, selecting $(2^{R_n}-1)$ minor sampling pixel data from the n-th major Gamma segment, wherein the minor sampling pixel data are sequentially numbered from a first minor sampling pixel datum to a $(2^{R_n}-1)$-th minor sampling pixel datum, where $R_n$ is a value corresponding to the n-th major sampling pixel datum and the n-th major Gamma segment; and according to the Gamma curve, storing the corresponding Gamma relationships of these major and minor sampling pixel data in the Gamma table.

10. A Gamma correction method according to claim 9, wherein the $(2^M+1)$-th major sampling pixel data sequential form an arithmetical series.

11. A Gamma correction method according to claim 9, wherein the value of $R_n$, which corresponds to the number of minor sampling pixel data needed to be selected from the n-th major Gamma segment, increases with the maximum difference between the n-th major sampling line and its corresponding n-th major Gamma segment.

12. A Gamma correction method according to claim 9, wherein the $(2^{R_n}-1)$-th minor sampling pixel data selected from the n-th Gamma segment form an arithmetical series.

13. A Gamma correction method according to claim 9, wherein each $R_n$ is smaller than (J-M).

14. A method for performing Gamma correction on an input pixel datum according to a Gamma table, the Gamma table having $(2^M+1)$ major sampling pixel data, sequentially numbered from a first major sampling pixel datum to a $(2^M+1)$-th major sampling pixel datum, with $(2^{R_n}-1)$ minor sampling pixel data which exist between the n-th and the (n+1)-th major sampling pixel data and are sequentially numbered from a first minor sampling pixel datum to a $(2^{R_n}-1)$-th minor sampling pixel datum, wherein the input pixel datum is a binary datum of J bits; J is a positive integer larger than both positive integers M and N while n is a positive integer ranging from 1 to $2^M$; $R_n$ is a value corresponding to the n-th sampling pixel datum; the method the steps of:

selecting the a-th major sampling pixel datum according to first M bits of the input pixel datum, wherein a denotes a positive integer of 1 to $2^M$;

selecting the b-th and the (b+1)-th minor sampling pixel data according to first (M+1)-th bit to $(M+R_a)$-th bit of the input pixel datum, wherein b denotes a positive integer of 1 to $R_a$; and obtaining the Gamma corresponding relationship of the pixel datum via interpolation using the b-th and the (b+1)-th minor sampling pixel data.

15. A method according to claim 14, wherein the first M bits of the pixel datum are identical to first M bits of the a-th major sampling pixel datum.

16. A method according to claim 14, wherein first $(M+R_a)$ bits of the b-th minor pixel datum are identical to the first $(M+R_a)$ bits of the input pixel datum.

* * * * *